(12) United States Patent
Vun Cannon (10) Patent No.: US 6,792,361 B2
(45) Date of Patent: Sep. 14, 2004

(54) CONTROLLER FOR MONITORING FLUID FLOW VOLUME

(75) Inventor: James A Vun Cannon, Independence, MO (US)

(73) Assignee: Schneider Automation Inc., North Andover, MA (US)

( * ) Notice: Subject to any disclaimer, the term of this patent is extended or adjusted under 35 U.S.C. 154(b) by 0 days.

(21) Appl. No.: 10/250,256

(22) Filed: Jun. 18, 2003

(65) Prior Publication Data

US 2004/0055393 A1 Mar. 25, 2004

Related U.S. Application Data (60) Division of application No. 09/945,499, filed on Aug. 30, 2001, now Pat. No. 6,739,205, which is a continuation-in-part of application No. 09/784,375, filed on Feb. 15, 2001, now Pat. No. 6,644,133.

(51) Int. Cl.[7] .............................................. G06F 19/00
(52) U.S. Cl. ....................................... 702/46; 73/861.77
(58) Field of Search ............................. 702/45–47, 50, 702/100; 73/861.74, 861.75, 861.77–79

(56) References Cited

U.S. PATENT DOCUMENTS

| | | | | |
|---|---|---|---|---|
| 4,120,032 A | * | 10/1978 | Mirdadian | .................. 702/46 |
| 4,581,946 A | * | 4/1986 | Kanayama | ................ 73/861.77 |
| RE33,649 E | * | 7/1991 | Kawai | ......................... 137/554 |
| 5,072,416 A | * | 12/1991 | Francisco et al. | ........... 702/100 |
| 5,075,877 A | * | 12/1991 | Jacob et al. | .................. 702/51 |
| 6,104,875 A | * | 8/2000 | Gallagher et al. | .......... 717/168 |

* cited by examiner

Primary Examiner—Edward Lefkowitz
Assistant Examiner—Corey D. Mack
(74) Attorney, Agent, or Firm—David R. Stacey (57) ABSTRACT

A system, method and program for calculating a fluid flow volume within a conduit having an operably connected flow meter is disclosed. The system includes a controller having a backplane. A flow meter module is operably connected to the backplane of the controller and to the flow meter. A program embedded within the controller is also operably connected to the flow meter. The program includes a plurality of segments for sensing a characteristic of the fluid for determining the flow volume of the fluid. The controller, in cooperation with the flow meter module, monitors the dynamic fluid density of the fluid in the conduit. The controller utilizes the dynamic density to determine a correction factor to more accurately calculate the fluid flow volume through the conduit.

12 Claims, 9 Drawing Sheets

CONTROLLER FOR MONITORING FLUID FLOW VOLUME

CROSS REFERENCE TO RELATED APPLICATIONS

This patent application is a divisional of U.S. patent application ser. No. 09/945,499, filed on Aug. 30, 2001, now U.S. Pat. No. 6,739,205 entitled CONTROLLER FOR MONITORING FLUID FLOW VOLUME, which is a continuation-in-part claiming benefit to, and incorporating by reference, U.S. patent application Ser. No. 09/784,375, filed Feb. 15, 2001 now U.S. Pat. No. 6,644,133 and entitled, FLOW METER MODULE FOR A CONTROLLER.

BACKGROUND OF INVENTION

The present invention generally relates to a method, system, and program for monitoring and controlling a fluid transportation system. More specifically, the present invention is directed to a medium readable by a programmable device. The medium being operably connected to a controller for monitoring and controlling a fluid flow volume in a fluid transportation system.

The production, transportation and sale of energy sources has always required some form of measurement to determine the quantity produced, bought, or sold. The accuracy and reliability of a system that measures an energy source, i.e., gas and liquid, is extremely important to the buyers and sellers involved. A seemingly insignificant error within the measuring system can result in a large monetary loss.

Technological advances in the areas of fluid flow metering and computation has led to improved accuracy and reliability. Some of these advances have been made in the area of metering, or measuring, transported energy products. These advances have also focused on factors such as safety, reliability and standardization.

Today's metering and transfer system involves more than simply measuring fluid flow; it can also involve extensive electronics, software, communication interfaces, analysis, and control. Measuring fluid flow can involve multiple turbine meters with energy flow computers, densitometers, gas chromatography, meter proving systems and RTU or SCADA interfaces.

Measurement and control of energy sources are valuable processes for companies producing and transporting theses energy sources. Many governments, organizations and industries have enacted standards and regulations related to recovering, refining, distributing, and selling of oil and oil by-products i.e., gasoline, kerosene, butane, ethanol, etc. The energy resource industry has various standards and regulations to ensure the accuracy and safety of transporting and metering these energy sources.

The process of transporting a fluid energy source, e.g., oil, through a pipeline is monitored and controlled with the assistance of a combination of sensors and process computers. Generally, a computer processor monitors several aspects, e.g., fluid flow volume, of the oil transportation. The control of the equipment facilitating the transportation of oil is generally performed by environmentally robust devices such as a controller. The controller regulates valves, tanks, and scales without requiring an individual to constantly interact with the system.

A very important aspect of a fluid transportation system involves the fluid flow meter utilized to monitor the amount of oil delivered to a customer. Because of the vast amounts of fluid delivered, the accuracy of the fluid flow meter must be ensured at regular intervals. An inaccurate fluid flow meter can result in overcharging or undercharging a customer for the delivered product. An inaccurate flow metering system can result in significant amounts of unpaid products, i.e., shrinkage.

A turbine flow meter is an accurate and reliable flow meter for both liquid and gas volumetric flow. Some applications utilizing a turbine flow meter involve water, natural gas, oil, petrochemicals, beverages, aerospace, and medical supplies. The turbine comprises a rotor having a plurality of blades mounted across the flow direction of the fluid. The diameter of the rotor is slightly less than the inner diameter of a conduit, and its speed of rotation is proportional to the volumetric flow volume through the conduit. Turbine rotation can be detected by solid state devices or mechanical sensors.

In one application utilizing a variable reluctance coil pick-up, i.e., a permanent magnet, turbine blades are made of a material attracted to the magnet. As each blade of the turbine passes the coil, a voltage pulse is generated in the coil. Each pulse represents a discrete volume of liquid. The number of pulses per unit volume is called the meter's K-factor.

In another application utilizing inductance pick-up, a permanent magnet is embedded in the rotor. As each blade passes the coil, a voltage pulse is generated. Alternatively, only one blade is magnetic and the pulse represents a complete revolution of the rotor. Depending upon the design, it may be preferable to amplify the output signal prior to its transmission.

The accuracy of a turbine flow meter partially depends upon proving the fluid flow meter and the ability to provide correction factors to compensate for meter inaccuracies caused by damage to the meter or surrounding environmental conditions. At a minimum, a typical flow computer utilizes the following industrial standard volume flow equations to determine the correction factors. The American Petroleum Institute defines the API 2540 standard to determine flow of liquid hydrocarbons that includes the following techniques: meter proving; correction for temperature, density (fluid gravity) and pressure of the fluid flowing; pulse interpolation; pulse fidelity; correction for the temperature and pressure of the conduit material (typically steel); and audit trails and report specifications. The American Society for Testing & Materials that defines the ASTM D1250 and the American National Standards Institute that defines the ANSI D1250 standard have adopted, in their respective industry segments, the API 2540 standards. The American Petroleum Institute also defines a M factor used to correct for the loss of turbine accuracy. Over time, the turbine becomes less accurate due to wear and tear; and the M factor a dimensionless number incorporated into the API 2540 equations adjusts for turbine inaccuracy. API 2540, ASTM D1250 and ANSI D1250 are expressly incorporated herein by reference.

Proving the fluid flow meter is a process for ensuring the accuracy and reliability of the flow meter. Typically, a section of the fluid system called a proving loop is utilized during the meter proving. The dimensions of the proving loop are known and the flow of fluid within the loop can be monitored by sensors wherein a variety of fluid characteristics can be sensed. The meter proving process simultaneously monitors a pulse signal generated by a turbine operably connected within the fluid system. The flow volume of the fluid is determined by utilizing the sensed values of the fluid's characteristics with the industrial standard flow volume equations. The calculated flow volume is then compared to the known flow volume of the proving loop. By comparing the calculated fluid flow volume to the known fluid flow volume of the proving loop, the accuracy of the flow meter can be determined.

Generally, the duration of a meter proving process is approximately one hundred thousand turbine pulses. This amount of time is believed to be adequate to accurately determine the fluid flow volume. Often times, the turbine pulse signal is not in synch with the flow meter proving process, i.e., generally the meter proving process will not start at the beginning of the turbine pulse signal. When the pulses are counted at the end of the proving period, the partial pulses occurring at the beginning and end of the proving period are omitted. Because of the duration of the proving period, it is generally believed that these partial pulses are negligible. However, utilizing the partial pulses and other characteristics of the fluid and conduit, the time required for the meter proving process can be reduced.

This invention is directed to solving these and other problems.

SUMMARY OF INVENTION

The present invention is directed to utilizing a software program operable within a controller to monitor a flow volume in a fluid transportation system. The software interacts with the controller, e.g., programmable logic controller (PLC), and an operably connected flow meter to sense a characteristic of the fluid for calculating the fluid flow volume of the liquid. The sensed characteristic of the fluid, e.g., temperature, density, and pressure; is utilized by the software program to determine correction factors to be incorporated with industrial standard equations. The software program also includes an interpolation method for any partially sensed revolutions of the flow meter occurring during a meter proving process. The software program provides correction factors to the flow meter via the controller and its turbine meter module. The supplied correction factors adjust the flow meter for any inaccuracies; thereby, reducing product shrinkage. The resultant correction factors, in communication with the turbine meter card, provide a less expensive implementation for controlling and monitoring a fluid transportation system without the need of a separate fluid flow computer.

One embodiment of the present invention is directed to a system for calculating a flow volume of a fluid within a conduit having an operably connected flow meter. The system comprises a programmable logic controller having a backplane. A flow meter module is operably connected to the backplane of the programmable logic controller and to the flow meter. A program operably connected within the programmable logic controller includes a plurality of segments for cooperating with the flow meter to sense a characteristic of the fluid. Data received from the flow meter is utilized by the program to calculate the flow volume of the fluid within the conduit.

In a further aspect of the present invention, the fluid characteristic sensed by the flow meter is temperature, pressure, and/or density. The sensed characteristic is utilized by the controller to provide a real-time update of an industrial correction factor wherein the computation of the fluid flow volume is adjusted in response to the sensed characteristic. Alternatively, characteristics of the conduit can also be monitored and utilized by the controller to provide real-time updates of the industrial correction factor.

A further embodiment of the present invention is directed to a method of measuring a flow volume of a fluid within a conduit. A controller is connected to a flow meter and the conduit. The controller monitors the fluid flow volume through a plurality of input channels operably connected to the flow meter of a fluid transportation system. The controller senses a pulse signal generated by the flow meter over a predetermined time frame. A densitometer operably connected to the controller senses the real time density of the fluid. The sensed density is stored by the controller as a dynamic variable to be utilized in the determination of the flow volume. The controller utilizes the sensed dynamic density in cooperation with the standard industrial equations, AGA/API 2540, for calculating a flow volume.

In another embodiment of the present invention, a medium for calculating a flow volume of a fluid within a conduit is disclosed. The medium is readable by a programmable logic controller being operably connected to a flow meter and a conduit. The medium includes a program comprising several segments cooperating to determine the flow volume of a fluid. A first segment obtains a characteristic of the fluid. The characteristic being temperature, pressure, and/or density. A second segment utilizes an industrial standard equation, API 2540, to calculate a correction factor in response to the sensed fluid characteristic. And a third segment calculates a meter correction factor in response to a meter proving.

Another embodiment of the present invention is directed to a method of proving a flow meter. The flow meter is connected to a controller and a proving loop within a fluid transportation system. The proving loop has a known flow volume. The controller monitors a fluid flow within the proving loop. The method comprises the steps of starting a meter proving period and sensing a pulse signal responsive to a flow meter. The flow meter generates a fluid flow through the fluid transportation system. The meter proving process is terminated and the amount of sensed pulse signals occurring during the meter proving period is calculated. The fluid flow volume of the proving loop is determined in response to the pulse signals occurring during the meter proving process and other sensed characteristics of the fluid and conduit, preferably density and temperature. The calculated flow volume of the proving loop is compared against the known volume of the proving loop.

A further aspect of the above embodiment of the present invention is directed to adjusting the flow meter and/or controller in response to the comparison of the calculated flow volume of the proving loop and its known flow volume, wherein the fluid flow meter and/or controller more accurately calculate the flow volume.

An object of the present invention is to utilize standard industrial equations embedded within the programmable logic controller, rather than incorporated within a remote I/O device such as a flow computer, to reduce the time and cost of meter proving and to improve the accuracy when calculating the fluid flow rate of a liquid within a conduit. The use of frequently updated correction factors with the meter flow equations improves the accuracy and reliability of the flow meter. The controller senses real-time process variables, e.g., fluid and conduit characteristics used in the standard flow equations, and calculates a more accurate correction factor. Because the programmable logic controller monitoring and controlling the metering process utilizes the correction factor more frequently, shrinkage will be reduced.

Cost savings are obtained because the programmable logic controller replaces the flow computer, as a remote I/O device. Removing the flow computer as an I/O device from the already present PLC reduces cost and inaccuracy. In place of the flow computer, the system uses existing I/O to measure characteristics, such as, density, temperature and pressure of the flowing fluid and of the conduit material encapsulating the fluid. The PLC adds flexibility because characteristics affecting the fluid (stated above in this paragraph) are resident in the memory of the PLC. Other features of the PLC such as processing speed; tables containing standards; and remote web access can be added without difficulty. Moreover, the PLC can store past values to help ensure repeatability already inherent in a fixed, stable system that a PLC offers. In addition, more accurate flow volume calculations can be obtained by utilizing additional characteristics of the fluid and conduit, i.e., real time density, temperature, and pressure values, in cooperation with the industrial standard equations of API 2540 AGA-7.

Other advantages and aspects of the present invention will become apparent upon reading the following description of the drawings and detailed description of the invention.

DETAILED DESCRIPTION

While this invention is susceptible of embodiments in many different forms, there is shown in the drawings and will be herein described in detail a preferred embodiment of the invention with the understanding that the present disclosure is to be considered as an exemplification of the principles of the invention and is not intended to limit the broad aspect of the invention.

In one application of the present invention, a flow meter 10, preferably a turbine, comprises a rotor 12 having a plurality of blades 14 mounted across the flow direction of the fluid within a conduit 16. See FIGS. 1 and 2. The diameter of the rotor 12 is slightly less than the inner diameter of the conduit 16, or pipe, and its speed of rotation is proportional to the volumetric flow of the fluid. Turbine rotation can be detected by solid state devices or mechanical sensors. As each blade 14 revolves, a voltage pulse is generated. Each pulse represents a discrete volume of liquid. Alternatively, only one blade 14 can generate a pulse, thus, each pulse represents one complete revolution of the rotor 12. The number of pulses per unit volume is called the meter's K-factor.

Figure 1:
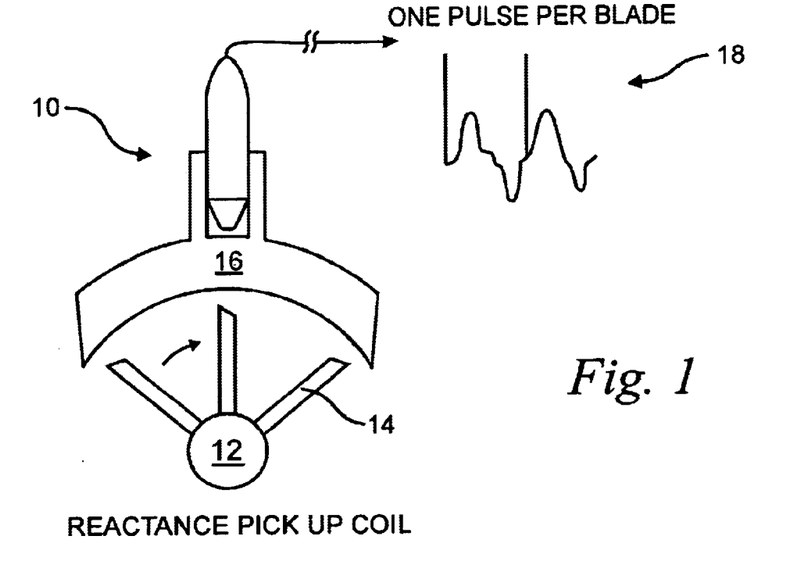
FIG. 1 is diagram depicting one embodiment of a turbine flow meter.
Figure 2:
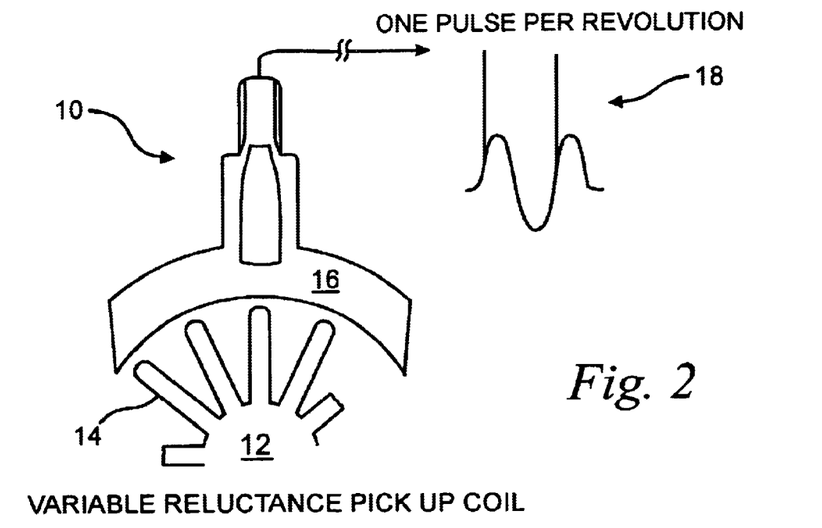
FIG. 2 is a diagram depicting another embodiment of a turbine flow meter.

The rate of rotation and registration of each rotor blade 14 implies the passage of a fixed volume of fluid. Fluid flow in a pipeline is the actual volume of fluid that passes a given point during a specified time. Volumetric flow can be calculated by monitoring various characteristics of the fluid, such as velocity, temperature, density, and pressure. These characteristics are sensed by a controller 20 for use with industrial standard equations for fluid flow calculation, preferably in accordance with AGA-7 and API 2540 standards.

Figure 3:
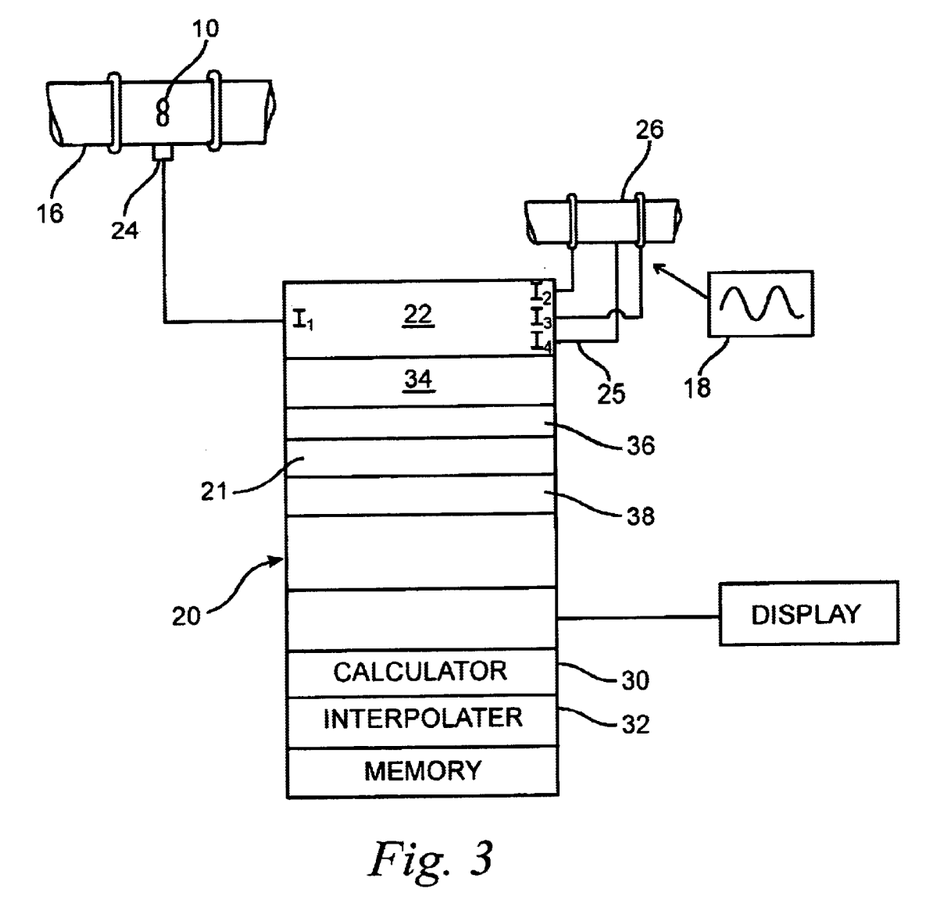
FIG. 3 is a block diagram of one embodiment of the present invention.
Figure 4:
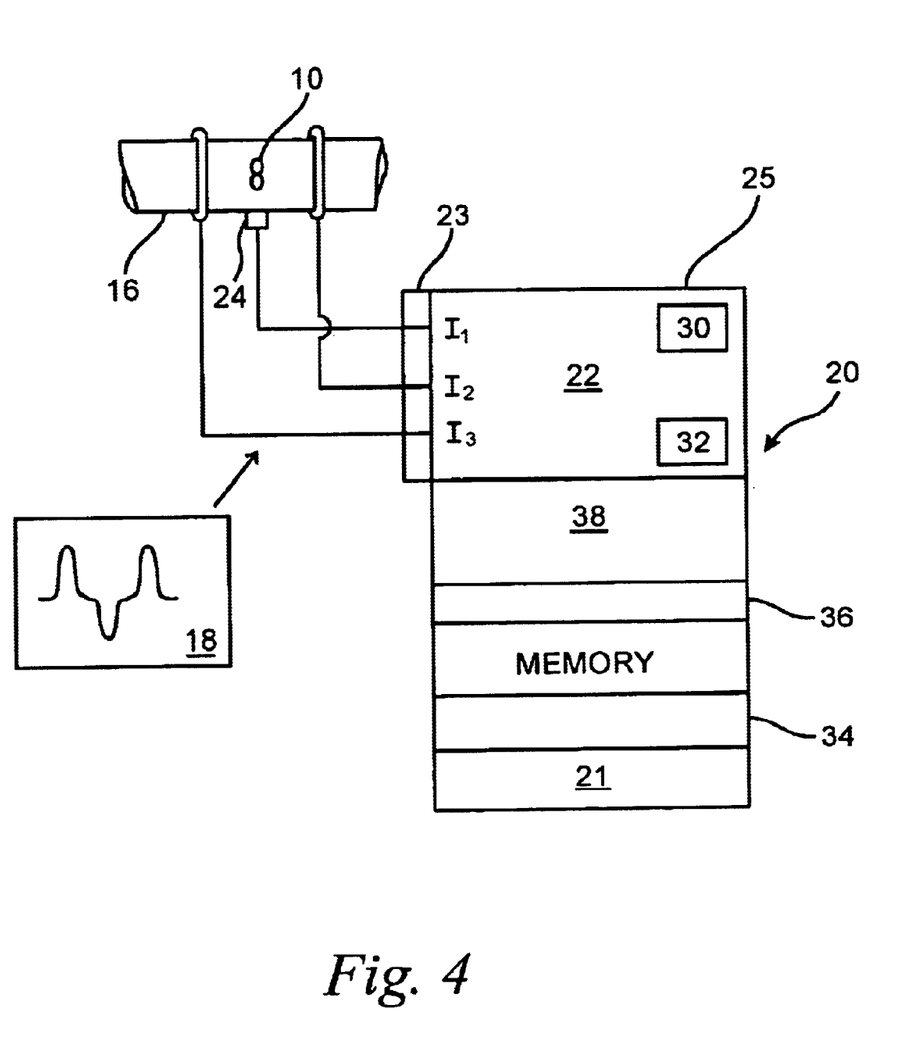
FIG. 4 is a block diagram of another embodiment of the present invention.

A controller 20 having a flow meter module 22 operably attached to the backplane 23 of the controller, is operably connected to the flow meter 10 via a plurality of input channels 25, i.e., $I_1, I_2, I_3$, etc. The pulse signal generated by the turbine 10 is received by the flow meter module 22. The input channels of the flow meter module 22 are adapted to receive input signals in the range of 25 mVDC. Thus, the flow meter module 22 can be directly connected to the flow meter 10. The flow meter module 22 receives the flow meter frequency signal and can be programmed with K and M factors for converting the frequency input to a specified volumetric flow volume measurement unit. Typical units of volumetric flow include gallons (or liters) per minute and cubic feet (or meters) per minute. The M factor is a dimensionless number correcting for accuracy loss over the life of the turbine meter, form wear and tear. The K factor is defined as "pulses per unit volume. Other meters generating pulses, such as a Corolis meter, and a positive displacement meter can be used in place of the flow meter 10.

A more accurate fluid flow volume can be calculated by utilizing the real-time fluid density of the fluid in cooperation with the industrial standard equations. See FIG. 4. For example, a densitometer 24 is operably connected to an input channel 25 of the controller 20. The densitometer 24 senses the density of the fluid within the pipeline 16. The densitometer 24 outputs either a frequency (linearized by the programmable logic controller (PLC)) or a 4–20 mA output into the PLC, which represents a real-time sensed density; used by the API 2540 standard equations Chapter 21, incorporated herein by reference. The real-time sensed density value is utilized with AGA/API 2540 standard to calculate the flow volume. Preferably, the real-time sensed density values are stored as a dynamic variable within the flow meter module 22. Utilizing dynamic density values with the dual chronometry pulse interpolation standard equation of API 2540 takes into account the effects that changing pressure and temperature of the fluid (and the material of the conduit 16 itself) will have on the calculated flow volume. The use of the dynamic density values provides for a more accurate flow volume than a flow volume calculated with a static density variable for a fluid having an assumed temperature and pressure value.

Figure 6A:
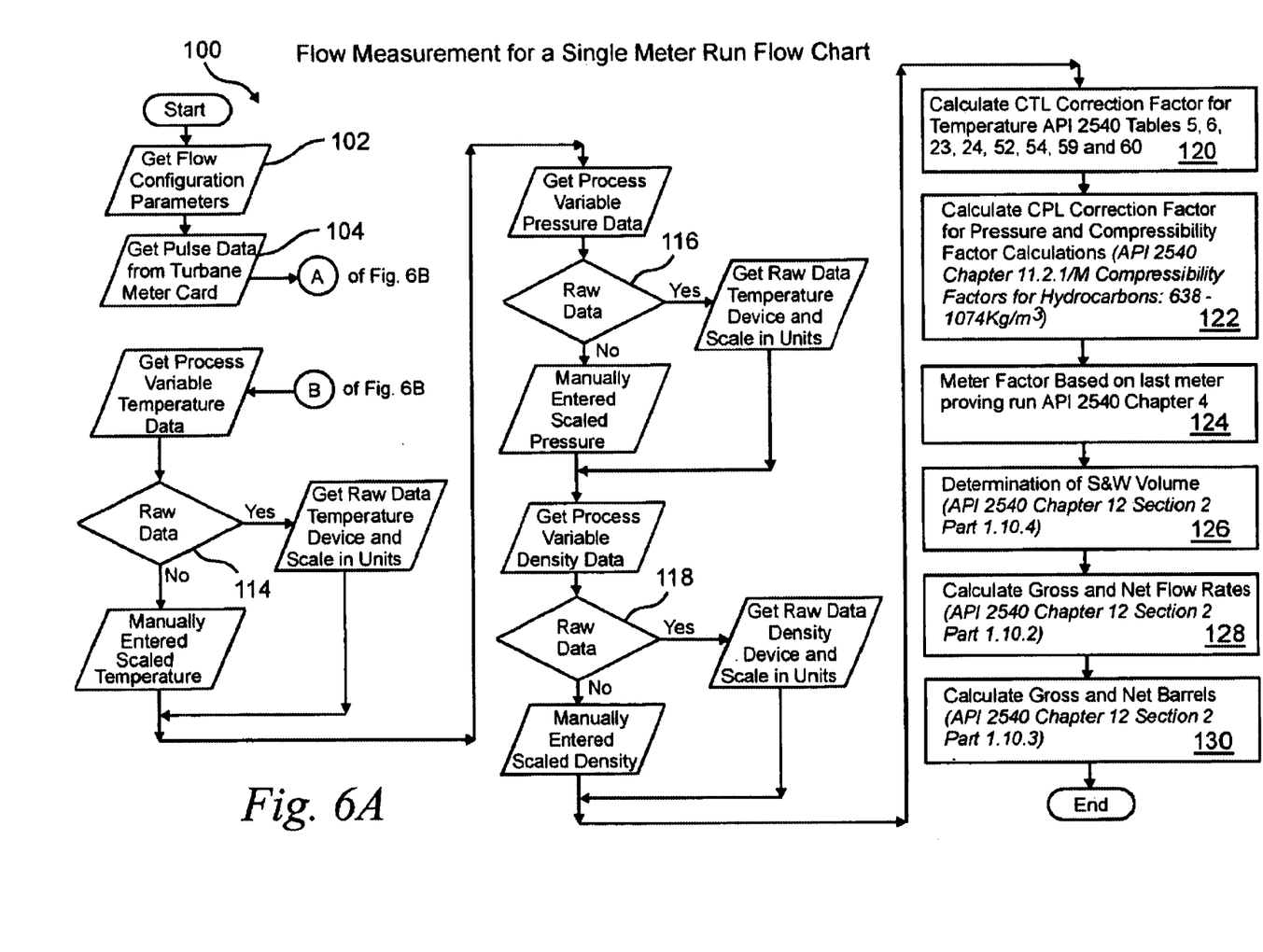
FIG. 6A is a flow chart showing a process for measuring fluid flow utilizing a single meter run.
Figure 6B:
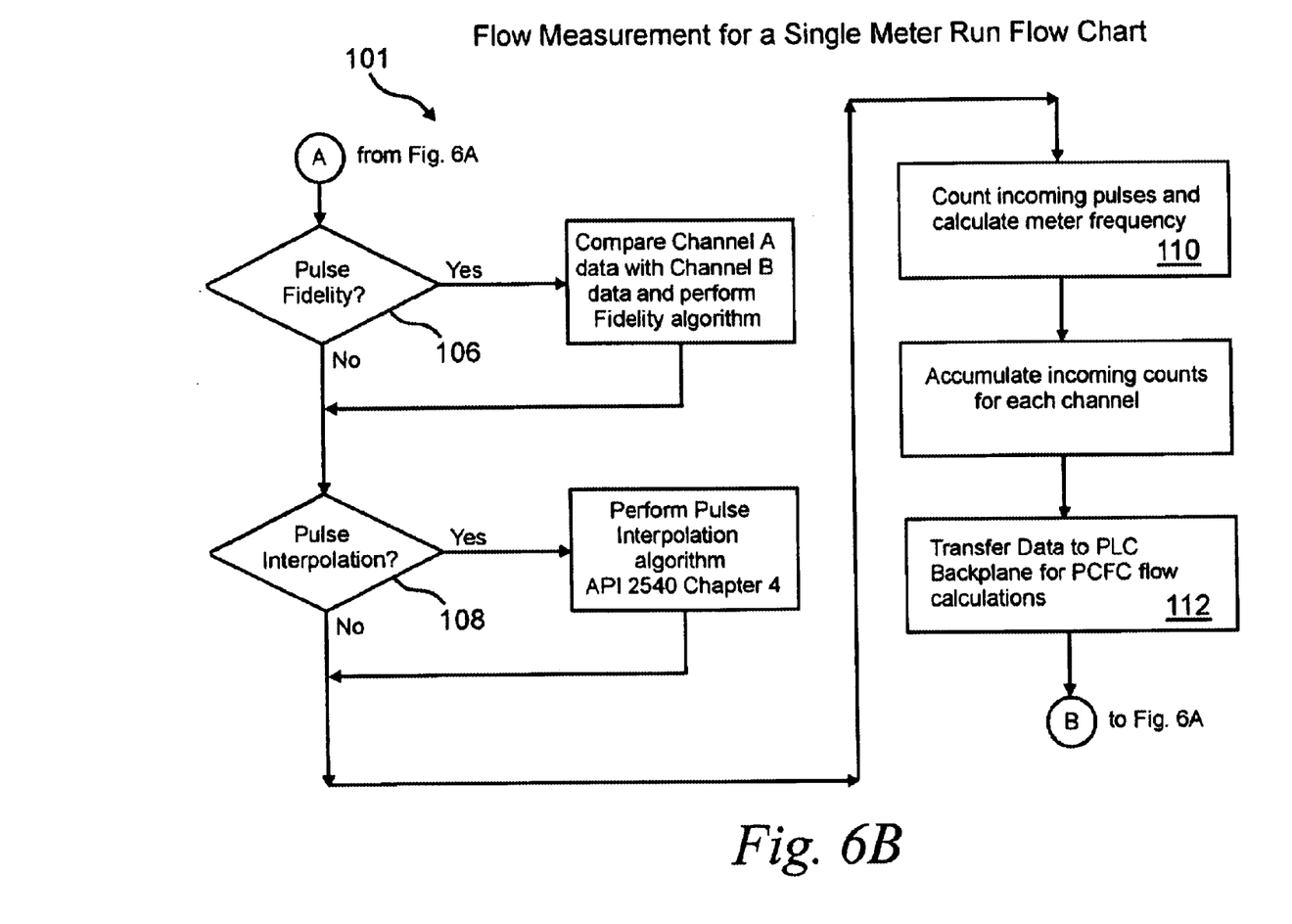
FIG. 6B is a flow chart showing a process for counting pulses during the fluid flow measurement process.

Referring to FIGS. 6A and 6B, flow charts 100, 101 show the preferred method of calculating the fluid flow volume of a flow meter. The operator configures the flow meter 10 by providing various operating parameters to the controller 102, e.g., type of liquid, i.e., premium gasoline, crude oil, etc.; density; etc. The controller 10 receives pulse data through the turbine meter module 104. Depending upon the configuration of the flow meter 10, multiple input channels 25 can be utilized to sense pulses generated by the flow meter. To further ensure data received through the input channels 25, the operator can elect to utilize the Fidelity algorithm 106 provided in API 2540. The Fidelity algorithm 106 compares the pulse data received on the input channels 25 and confirms the reliability of the pulses generated by the flow meter 10.

Independent of the execution of Fidelity algorithm 106, the operator can select to interpolate the pulses generated by the flow meter 108. The calculation of the sensed pulse signals is the sum of the full pulse signals and the partial pulse signals occurring during the fluid flow measurement process. The partial pulse signals are interpolated to provide an accurate pulse signal measurement. The controller utilizes API standard 2540 Chapter 4 equations to interpolate the sensed signals for determining the partial pulses. The partial pulses are added to the full pulses to more accurately determine the fluid flow volume. Regardless of whether pulse interpolation is conducted, the incoming pulses are counted and a meter frequency is calculated 110. The pulse count is then transmitted to the programmable logic controller for fluid flow computation 112.

Along with the accumulated pulse date and calculated meter frequency, several variables can be utilized to more accurately calculate the fluid flow volume. Preferably, these variables are characteristics of the fluid being measured. For instance, temperature 114, pressure 116, and density 118 of the liquid can be sensed or provided. Additionally, the temperature of the conduit 16 can also be considered. In response to these characteristics, a correction factor for temperature (CTL) 120, and pressure and compressibility (CPL) 122 can be calculated and utilized to more accurately determine the fluid flow volume. CTL is determined by utilizing API 2540 Tables 5, 6, 23, 24, 53, 54, 59, and 60. CPL is determined through API 2540, Chapter 11.2.1/M for hydrocarbons: 638–1074 Kg/m$^3$. An operation log of the meter can also be taken into account based on a past meter proving 124.

Sediment and water volume can be determined 126 under API 2540 Chapter 12, Section 2, Part 1.10.4. Through the use of the calculated correction factors, the gross 128 and net 130 fluid flow rates and the gross and net barrels can be determined using API 2540 Chapter 12, Section 2, Part 1.10.2 and 1.10.3, respectively 112, 114.

In another embodiment of the present invention, the controller executes a meter proving process by measuring the quantity of fluid flow through a proving loop of known volume. Proving the fluid flow meter 10 is a process for ensuring the accuracy and reliability of the flow meter. The flow volume of the fluid is determined by utilizing the sensed characteristics of the fluid (and conduit) with industrial standard flow volume equations, e.g., AGA-7/API 2540 standards.

Figure 3A:
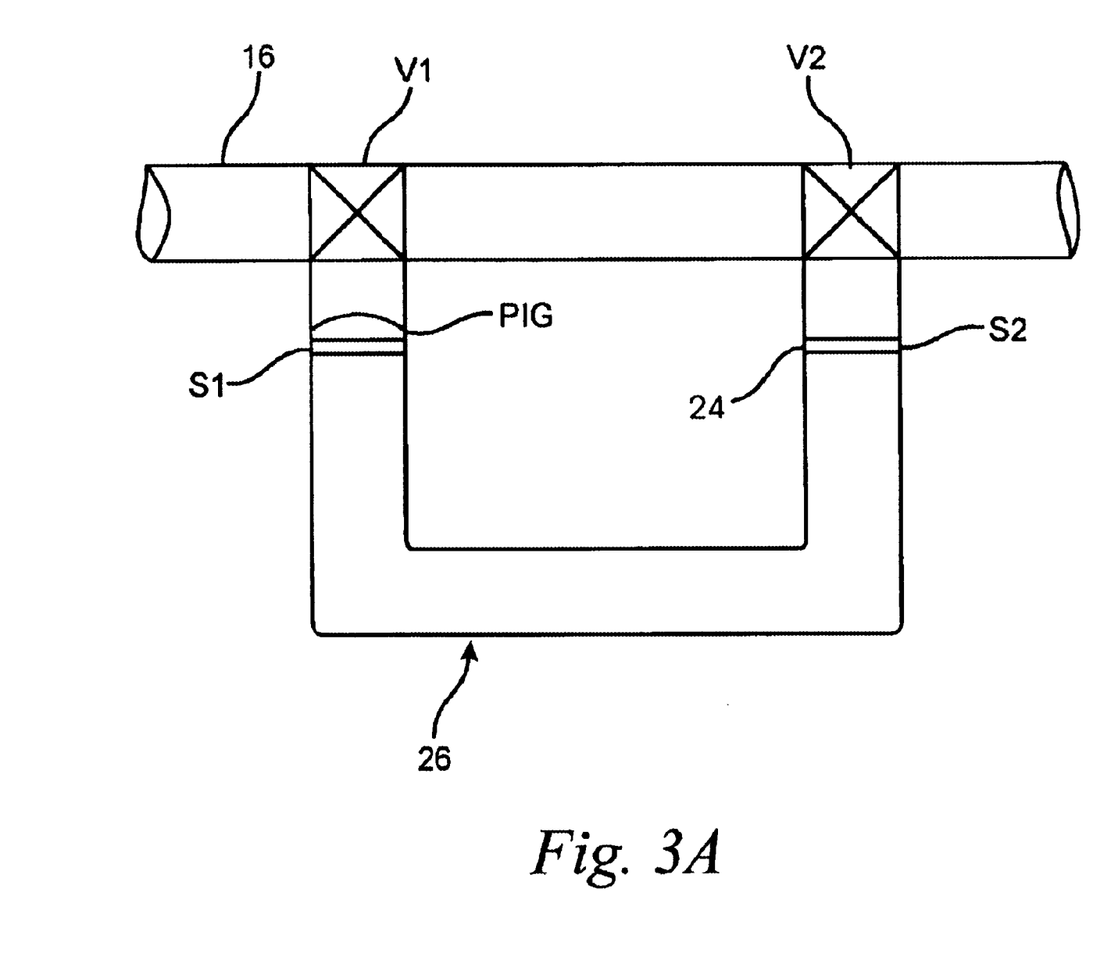
FIG. 3A is a block diagram of an embodiment of a proving loop used with the present invention.

See FIGS. 3 and 3A. Typically, a section of the pipeline 16 called a proving loop 26 is utilized during the meter proving. The dimensions of the proving loop 26 are known and the flow of fluid through the loop can be monitored by sensors wherein a variety of fluid characteristics can be sensed. The number of meter pulses are converted to a volume unit of measure. The calculated flow quantity is then compared to the known flow volume of the meter proving loop 26 to provide an error measurement on the flow meter 16.

The controller 20 signals the proving loop to start its proving process. The controller receives a first signal from the proving loop indicating the start. The controller 20 receives a second signal from the proving loop indicating the end. Between the first and second signals, the controller 20 senses the number of meter pulses.

During the meter proving process, the controller 20 senses the amount of pulse signals generated by a turbine 10 that occurred. The controller utilizes a calculator 30 to calculate the a fluid volume for the proving loop 26 in response to the sensed pulse signals that occurred during the meter proving process. By comparing the calculated fluid flow volume to the known fluid flow volume of the proving loop 26, one can determine the accuracy of the flow meter 10.

The proving loop 26 is a U-shaped conduit having a known fluid volume. FIG. 3A. The proving loop 26 is operably attached to the fluid transportation system. A pair of valves V1, V2 connect the ends of the proving loop 26 to the system. At the start of the meter proving process, the valves are switched to allow fluid into the proving loop 26. The fluid entering the proving loop 26 pushes a ball, e.g., pig, through the proving loop. Initially, the ball passes and activates a first switch, S1 27. Upon activation of the first switch, S1 27, the controller 20 senses the pulses generated by the flow meter 10 until the meter proving process is terminated when the ball passes a second switch, S2 29. The time it takes the ball to travel from the first switch, S1 27, to the second switch, S2 29, is the duration of the meter proving period.

During the meter proving process, the flow meter module 22 senses the density of the fluid flowing in the proving loop 26. The sensed density values are linearized by the controller 20. Actual values can be used from a table stored within the controller 20. The controller 20 utilizes the linearized density value and the amount of pulses sensed during the meter proving process to calculate a correction factor, M, to later be used by a program, preferably residing in the memory of the controller for determining the volume of fluid flowing through the transportation fluid system. The M correction factor is utilized in equation AGA-7 to determine the accuracy of the flow meter 10 in the system. The accuracy of the flow meter 10 can be improved by adjusting the flow meter or the calculations, used to determine the fluid flow volume.

Other characteristics of the fluid can be utilized to obtain a more accurate calculation of the fluid flow volume. The controller is capable of sensing the temperature and pressure of the fluid flowing through the conduit 16. The program adjusts the fluid density for temperature, pressure, and compressibility of the fluid. The program utilizes the repetitively sensed and adjusted fluid density values to update the measured volume during meter proving.

Figure 5:
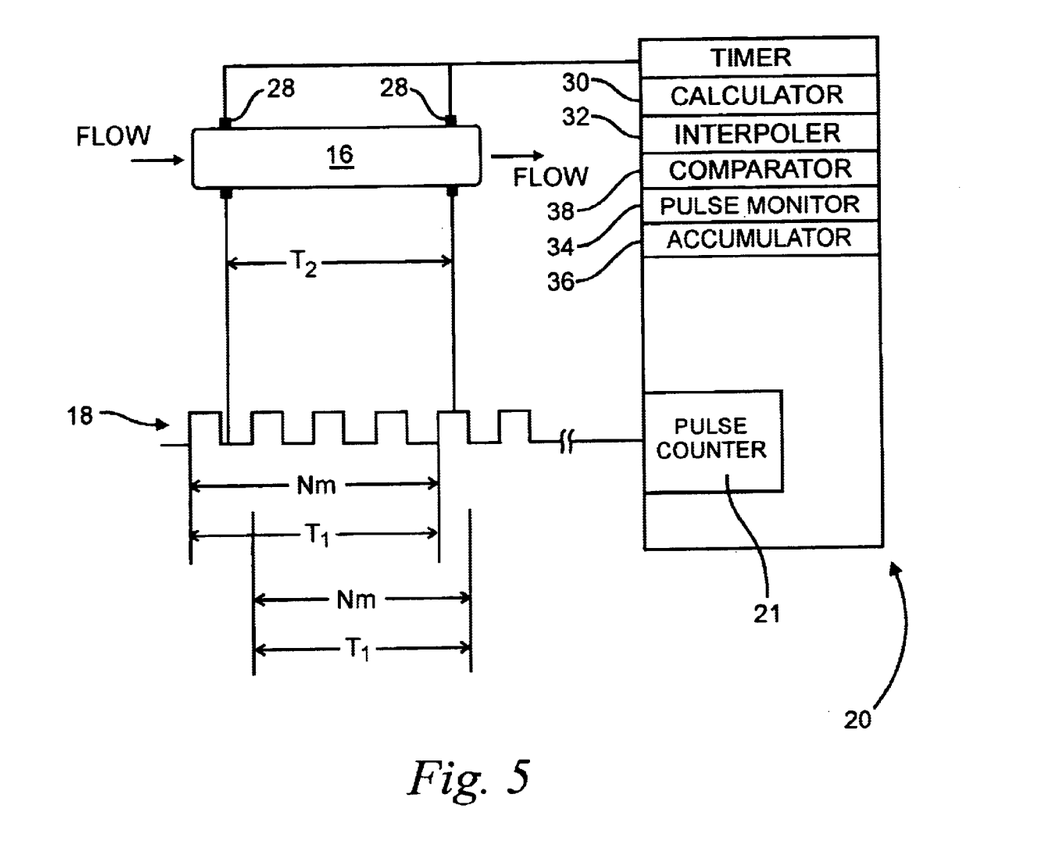
FIG. 5 is a timing diagram of the interpolation method of the present invention.

Generally, the turbine pulse signal 18 is not in synch with the flow 10 proving process, i.e., the meter proving process will generally not start at the beginning of the turbine pulse signal 18. FIG. 5. Thus, partial pulses 18 occur at the beginning and end of the proving period. An interpolator 32 utilizes a pulse interpolation method to improve the discrimination of the flow meter's output, thus requiring a lesser amount of pulse signals to be collected during the meter proving process. Because fewer pulse signals 18 are required, the proving loop 26 can be shortened, thus reducing the cost of the fluid transportation system.

While various interpolation methods can be used, the preferable interpolation method utilized by the controller 20 is the double chronometry method of API 2540. Double chronometry pulse interpolation requires counting a total integral number of flow meter pulses, Nm, generated during the proving process and measuring a set of time intervals, T1 and T2. FIG. 5. T1 is the time interval between the first pulse before or after the first detection signal and the first pulse before or after the last detection signal. T2 is the time interval between the first and last detector pulses.

The pulse monitor 34 is started and stopped by a meter prover detector 28. The time intervals T1 and T2 correspond to Nm pulses and the interpolated number of pulses, N1, respectively. The interpolated pulse count, N1, is equal to Nm(T2/T1). An accumulator 36 sums and stores the total number of pulse signals for use by the controller 10 in determining flow volume. The total number of pulses is the sum of the integral pulses and the interpolated partial pulses.

Figure 7A:
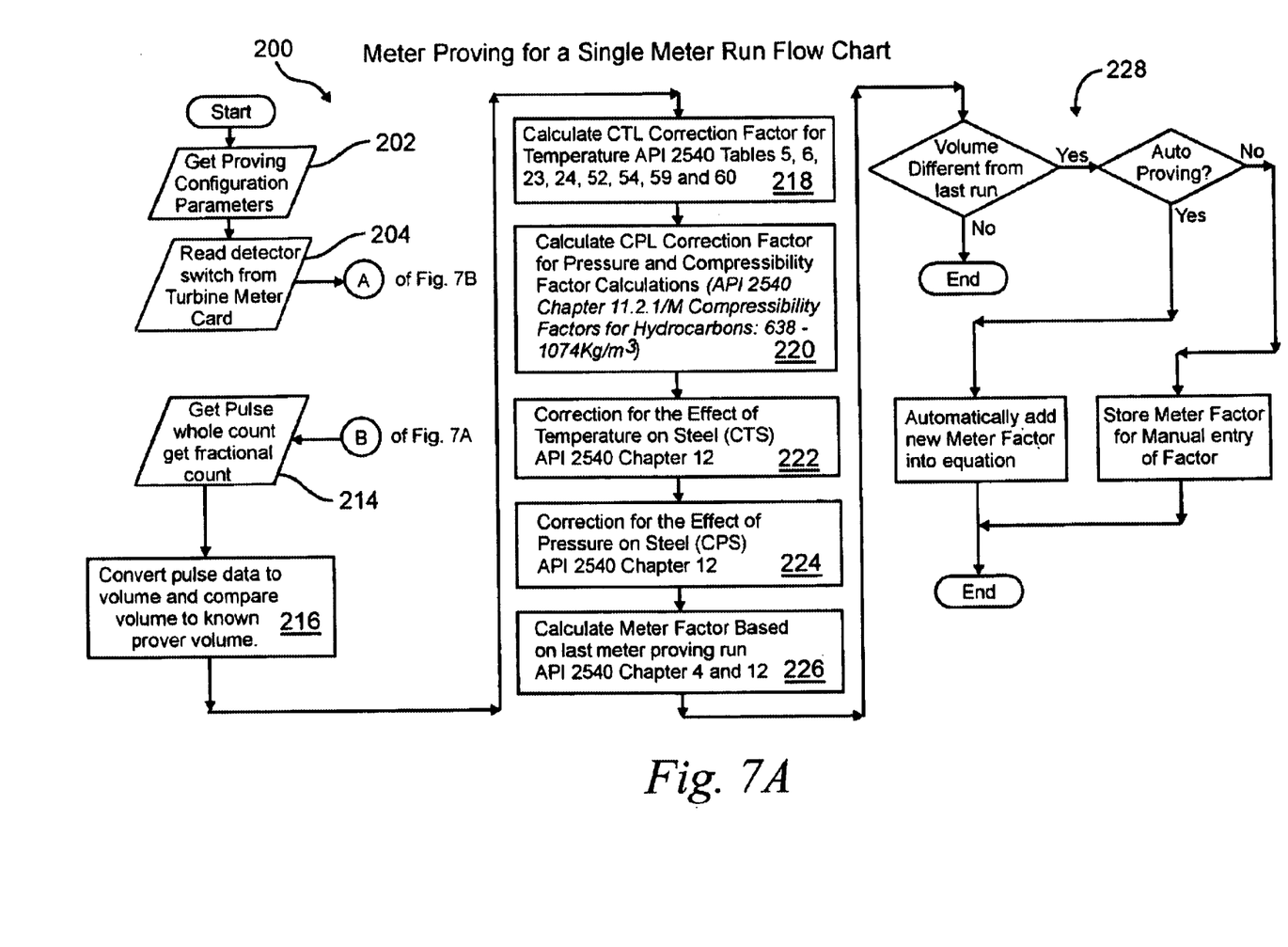
FIG. 7A is a flow chart showing a process for meter proving utilizing a single meter run; and, FIG. 7B is a flow chart showing a process for counting pulses during the meter proving process.
Figure 7B:
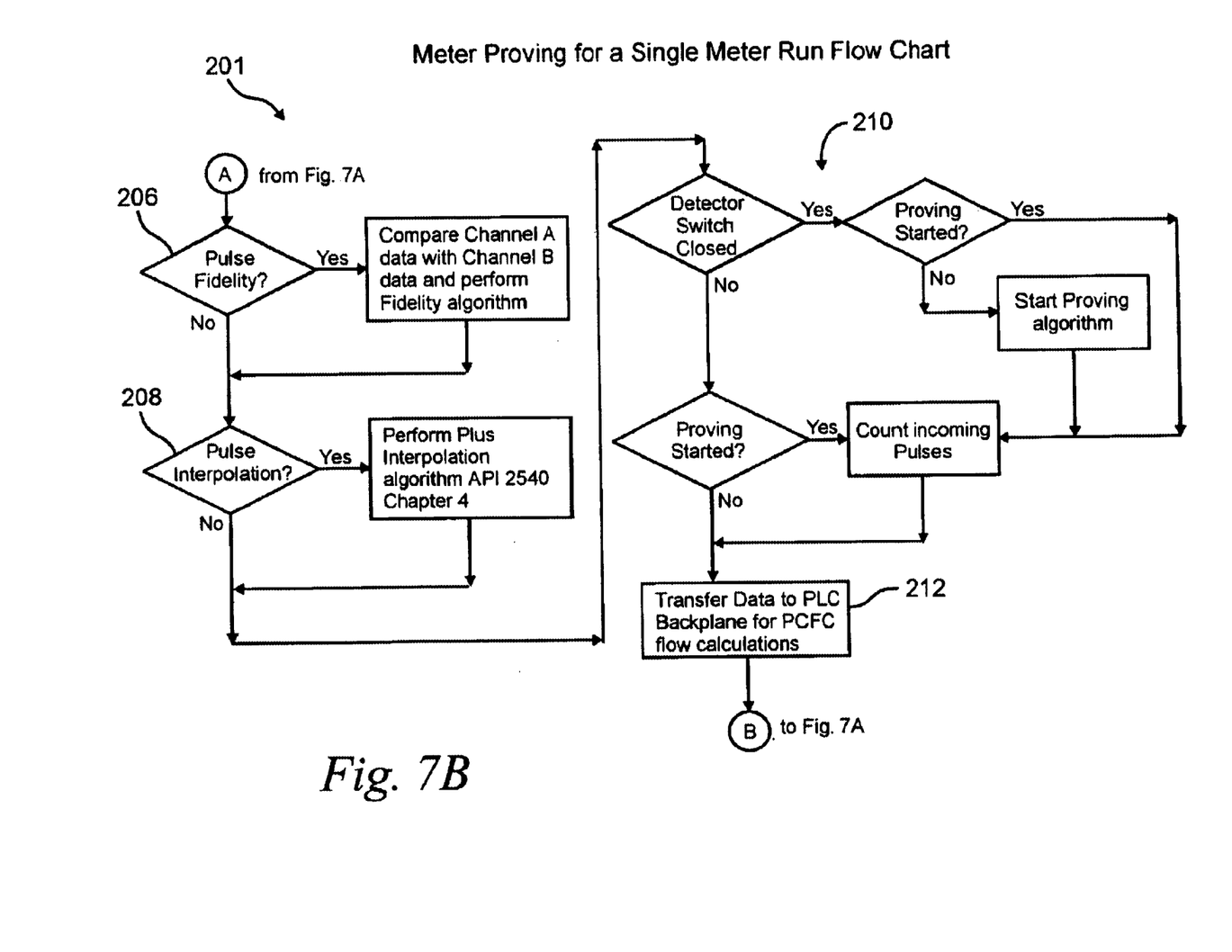

Referring to FIGS. 7A and 7B, flow charts 200, 201 depict the preferred method of meter proving for a single flow meter. Similar to the method of calculating a fluid flow volume 100, 101, an operator configures the controller 10 by providing operating parameters, e.g., type of liquid, density, etc. to the controller 202. The meter proving process is begun and the ball trips the first detector 204. If more than one pulse counter 21 is being implemented during the meter proving process, data from each channel is compared using the Fidelity algorithm 206 provided in API 2540. Similar to the flow measurement process discussed earlier, the pulse interpolation of API 2540 can be performed at this point if the option is selected by the operator 208. Once the detector switch is closed, a proving algorithm is begun and the pulses are counted 210. The counted pulses are transmitted to the backplane 23 of the programmable logic-controller 10 for flow calculations 212. The pulse whole count and pulse fractional count is calculated 214 and converted 216 to a volume and the converted volume is compared to the known volume.

Various characteristics of the fluid and the conduit can be utilized to more accurately conduct the meter proving process wherein a correction factor is implemented with standard equations for improving the determination of fluid flow. The temperature of the fluid is sensed and a correction factor, CTL, is calculated 218 using API 2540 Tables 5, 6, 23, 24, 53, 54, 59, and 60. The pressure of the fluid is sensed 220 and a correction factor, CPL, is calculated using API 2540 Chapter 11.2.1/M Compressibility Factors for Hydrocarbons: 638–1075 Kg/m$^3$. The temperature 222 and pressure 224 of the steel proving tube 26 is sensed and correction factors, CTS and CPS, respectively, are calculated using API 2540 Chapter 12.

Past performance of the flow meter 10 can also be considered and utilized to more accurately determine a fluid flow rate 226. A meter factor is calculated based on the last meter proving run using API 2540 Chapters 4 and 12. If the correction-adjusted measurement volume is different than the last meter proving run, the meter factor can be automatically added to the equation or can be stored for manual entry at a later time 228.

While the specific embodiment has been illustrated and described, numerous modifications come to mind without significantly departing from the spirit of the invention, and the scope of protection is only limited by the scope of the accompanying claims.

I claim:

1. A medium for calculating a flow volume of a fluid within a conduit, the medium being readable by a controller, the controller including a backplane and a flow meter module, the controller being operably connected to a flow meter, the flow meter being operably connected to the conduit, the medium comprising:
   a first segment for obtaining pulse data from the flow meter;
   a second segment for obtaining temperature data of the fluid;
   a third segment for obtaining density data of the fluid;
   a fourth segment for obtaining pressure data of the fluid;
   a fifth segment for calculating a correction factor for temperature, CTL, the calculation utilizing API 2540 Tables 5, 6, 23, 24, 53, 54, 59, and 60; and,
   a sixth segment for calculating a correction factor for pressure and compressibility, CPL, the calculation utilizing API 2540 Chapter 11.2.1/M Compressibility Factors for Hydrocarbons: 638–1074 Kg/m$^3$.

2. The medium of claim [1] further comprising:
   a seventh segment for calculating a meter factor responsive to a last meter proving run, the meter factor calculation utilizing API 2540 Chapter 4.

3. The medium of claim [1] further comprising:
   an eighth segment for calculating a sediment and water volume, the sediment and water volume calculation utilizing API 2540 Chapter 12, section 2, part 1.10.4.

4. The medium of claim [3] further comprising:
   a ninth segment for calculating a gross flow rate, the gross flow rate calculation utilizing API 2540 Chapter 12, section 2, part 1.10.2.

5. The medium of claim [4] further comprising:
   a tenth segment for calculating a net flow rate, the net flow rate calculation utilizing API 2540 Chapter 12, section 2, part 1.10.2.

6. The medium of claim [5] further comprising:
   an eleventh segment for calculating a gross barrel, the gross barrel calculation utilizing API 2540 chapter 12 section 12 part 1.10.3.

7. The medium of claim [6] further comprising:
   a twelfth segment for calculating a net barrel, the net barrel calculation utilizing API 2540 chapter 12 section 12 part 1.10.3.

8. The medium of claim [1] further comprising:
   a thirteenth segment for obtaining flow configuration parameters.

9. The medium of claim [1] wherein the first segment for obtaining pulse data comprises:
   a count segment for counting incoming pulses and calculating a flow meter frequency;
   an accumulation segment for accumulating the pulse count; and,
   a transmit segment for transmitting the pulse count to the controller.

10. A medium for proving a flow meter, the medium being readable by a controller, the controller including a backplane and a flow meter module, the controller being operably connected to a flow meter, the flow meter being operably connected to a conduit, the medium comprising:
    a first segment for reading a detector switch of a proving loop, the proving loop being operably connected to the flow meter;
    a second segment for obtaining a pulse data from the flow meter;
    a third segment for converting the pulse data to a volume and comparing the volume to a known volume;
    a fourth segment for calculating a correction factor for temperature, CTL, the calculation utilizing API 2540 Tables 5, 6, 23, 24, 53, 54, 59, and 60;
    a fifth segment for calculating a correction factor for pressure and compressibility, CPL, the calculation utilizing API 2540 Chapter 11.2.1/M Compressibility Factors for Hydrocarbons: 638–1074 Kg/m$^3$;
    a sixth segment for calculating the effect of temperature on the conduit, CTS, the calculation utilizing API 2540 Chapter 12;
    a seventh segment for calculating the effect of pressure on the conduit, CPS, the calculation utilizing API 2540 Chapter 12; and,
    an eighth segment for calculating a meter factor responsive to a last meter proving run, the meter factor calculation utilizing API 2540 Chapters 4 and 12.

11. The medium of claim [10] further comprising:
    a ninth segment for obtaining proving configuration parameters.

12. The medium of claim [10] wherein the second segment for obtaining pulse data comprises:
    a count segment for counting incoming pulses and calculating a flow meter frequency; and,
    a transmit segment for transmitting a pulse count to the controller.

* * * * *